US009230738B2

(12) United States Patent
Kim

(10) Patent No.: US 9,230,738 B2
(45) Date of Patent: Jan. 5, 2016

(54) MULTILAYER CERAMIC ELECTRONIC COMPONENT INCLUDING A LATERAL SURFACE AND INTERNAL ELECTRODES HAVING DIFFERENT DISTANCES FROM THE LATERAL SURFACE

(71) Applicant: SAMSUNG ELECTRO-MECHANICS CO., LTD., Suwon, Gyunggi-do (KR)

(72) Inventor: Hyung Joon Kim, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 91 days.

(21) Appl. No.: 13/779,662

(22) Filed: Feb. 27, 2013

(65) Prior Publication Data

US 2014/0177128 A1    Jun. 26, 2014

(30) Foreign Application Priority Data

Dec. 20, 2012    (KR) .......................... 10-2012-0149938

(51) Int. Cl.
*H01G 4/12*      (2006.01)
*H01G 4/30*      (2006.01)
*H01G 4/012*     (2006.01)

(52) U.S. Cl.
CPC ................. *H01G 4/12* (2013.01); *H01G 4/012* (2013.01); *H01G 4/30* (2013.01)

(58) Field of Classification Search
CPC ............ H01G 4/12; H01G 4/012; H01G 4/30
USPC ..................... 361/303, 301.4, 321.2
See application file for complete search history.

(56) References Cited

U.S. PATENT DOCUMENTS 6,473,292 B1 * 10/2002 Yoshida et al. ............ 361/321.2
6,683,782 B2 *  1/2004 Duva ............................. 361/311
(Continued)

FOREIGN PATENT DOCUMENTS

JP    02306608 A  * 12/1990
JP    04045509 A  *  2/1992
(Continued)

OTHER PUBLICATIONS

Decision of Rejection issued in Japanese Patent Application No. 2013-035408 dated Jul. 8, 2014, w/English translation.
(Continued)

*Primary Examiner* — David M Sinclair
(74) *Attorney, Agent, or Firm* — McDermott Will & Emery LLP

(57) ABSTRACT

There is provided a multilayer ceramic electronic component including: a ceramic body; a plurality of first internal electrodes formed within the ceramic body; a plurality of second internal electrodes alternately laminated together with the first internal electrodes with the dielectric layer interposed therebetween, insulated from the first internal electrodes, wherein a distance between the plurality of first internal electrodes 121 and the second lateral surface 2 and a distance between the plurality of second internal electrodes 122 and the second lateral surface 2 are different, and when the longest distance between the uppermost internal electrode and the lowermost electrode, among the plurality of first and second internal electrodes 121 and 122, is T1 and the shortest distance therebetween is T2, $0.76 \leq T2/T1 \leq 0.97$ is satisfied.

9 Claims, 7 Drawing Sheets

(56) References Cited

U.S. PATENT DOCUMENTS

| | | | |
|---|---|---|---|
| 7,054,134 B2* | 5/2006 | Togashi et al. | 361/301.4 |
| 7,083,745 B2* | 8/2006 | Shindo et al. | 252/518.1 |
| 8,098,478 B2* | 1/2012 | Niki et al. | 361/303 |
| 2004/0066603 A1 | 4/2004 | Saito et al. | |
| 2006/0139848 A1 | 6/2006 | Kim et al. | |
| 2010/0025075 A1* | 2/2010 | Feichtinger et al. | 174/126.1 |
| 2010/0206624 A1* | 8/2010 | Feichtinger | 174/260 |
| 2012/0147522 A1* | 6/2012 | Kim et al. | 361/321.2 |
| 2012/0306325 A1 | 12/2012 | Kim | |

FOREIGN PATENT DOCUMENTS

| | | | | |
|---|---|---|---|---|
| JP | 04171708 | A | * | 6/1992 |
| JP | 06084689 | A | * | 3/1994 |
| JP | 06084690 | A | * | 3/1994 |
| JP | 08279436 | A | * | 10/1996 |
| JP | 09-129486 | A | | 5/1997 |
| JP | 10289837 | A | * | 10/1998 |
| JP | 11-297566 | A | | 10/1999 |
| JP | 2000-124057 | A | | 4/2000 |
| JP | 2002015939 | A | * | 1/2002 |
| JP | 2004-022859 | A | | 1/2004 |
| JP | 2004-39840 | A | | 2/2004 |
| JP | 2004-140183 | A | | 5/2004 |
| JP | 2004-179436 | A | | 6/2004 |
| JP | 2006-179873 | A | | 7/2006 |
| JP | 2009026872 | A | * | 2/2009 |
| JP | 200954973 | A | | 3/2009 |

OTHER PUBLICATIONS

Japanese Office Action issued in Japanese Application No. 2013-035408 dated Feb. 4, 2014, w/English translation.

Notice of Office Action issued in corresponding Japanese Patent Application No. 2014-227169, mailed on Nov. 17, 2015; with English translation.

* cited by examiner

MULTILAYER CERAMIC ELECTRONIC COMPONENT INCLUDING A LATERAL SURFACE AND INTERNAL ELECTRODES HAVING DIFFERENT DISTANCES FROM THE LATERAL SURFACE

CROSS-REFERENCE TO RELATED APPLICATIONS

This application claims the priority of Korean Patent Application No. 10-2012-0149938 filed on Dec. 20, 2012, in the Korean Intellectual Property Office, the disclosure of which is incorporated herein by reference.

BACKGROUND OF THE INVENTION

1. Field of the Invention

The present invention relates to a multilayer ceramic electronic component in which a short circuit and delamination defect between internal electrodes are improved and acoustic noise generated when a voltage is applied is reduced.

2. Description of the Related Art

Electronic components using a ceramic material include capacitors, inductors, piezoelectric elements, varistors, thermistors, and the like.

Among ceramic electronic components using a ceramic material, a multilayer ceramic capacitor (MLCC) has advantages such as compactness, guaranteed high capacity, and ease of mountability.

An MLCC is a chip-type condenser commonly installed in computers, personal digital assistants, mobile phones, and the like, playing an important role in charging and discharging electricity. An MLCC may have various sizes and lamination forms, according to an intended use and capacity thereof.

In particular, recently, as electronic products have been reduced in size, MLCCs used in electronic products have also been required to be smaller and have a high capacity.

Thus, MLCCs including thinned dielectric layers and internal electrodes so as to have a reduced size and including a large amount of dielectric layers to have high capacity have been manufactured.

Meanwhile, an MLCC in which all external electrodes are positioned on a lower surface has been introduced. While this type of MLCC has excellent mounting density and capacity and low equivalent series inductance (ESL), when a ceramic body is cut, a short circuit defect may easily occur between the internal electrodes due to a thrust phenomenon occurring in internal electrodes facing one another, due to cutting stress.

In addition, as a lamination amount is increased to implement high capacity MLCC, a delamination defect is generated due to a step formed between a region in which internal electrodes are not formed and a region in which internal electrodes are formed.

RELATED ART DOCUMENT (Patent document 1) Japanese Patent Laid Open Publication No. 2004-022859

SUMMARY OF THE INVENTION

An aspect of the present invention provides a multilayer ceramic electronic component in which a short-circuit and delamination defects occurring between internal electrodes are improved and acoustic noise generated when a voltage is applied is reduced.

According to an aspect of the present invention, there is provided a multilayer ceramic electronic component including: a ceramic body including a dielectric layer and having first and second main surfaces opposing one another, first and second lateral surfaces opposing one another, and first and second end surfaces opposing one another; a plurality of first internal electrodes formed within the ceramic body, including a capacitance formation part having an overlap region to form capacitance and exposed to the first lateral surface, the first end surface, and the second end surface and a first lead out portion extending from the capacitance formation part so as to be exposed to the first lateral surface, and formed to be spaced apart from the second lateral surface by a predetermined interval; a plurality of second internal electrodes alternately laminated together with the first internal electrodes with the dielectric layer interposed therebetween, insulated from the first internal electrodes, having a second lead out portion extending from the capacitance formation part so as to be exposed to the first lateral surface, and formed to be spaced apart from the second lateral surface by a predetermined interval; first and second external electrodes connected to the first lead out portion and the second lead out portion, respectively; and insulating layers formed on the first lateral surface, the first end surface, and the second end surface of the ceramic body, respectively, wherein a distance between the plurality of first internal electrodes 121 and the second lateral surface 2 and a distance between the plurality of second internal electrodes 122 and the second lateral surface 2 are different, and when the longest distance between the uppermost internal electrode and the lowermost electrode, among the plurality of first and second internal electrodes 121 and 122, is T1 and the shortest distance therebetween is T2, $0.76 \leq T2/T1 \leq 0.97$ is satisfied.

Three or more of the plurality of first and second internal electrodes may form a single block, and the blocks may be iteratively laminated.

The first and second internal electrode patterns may be disposed to have the same shape within the respective blocks.

An amount of blocks may be 5 or more.

When the longest distance between the uppermost internal electrode and the lowermost electrode, among the plurality of first and second internal electrodes 121 and 122, is T1 and the shortest distance therebetween is T2, $0.85 \leq T2/T1 \leq 0.90$ may be satisfied.

The first and second internal electrodes may be disposed to be perpendicular with respect to a mounting surface of the ceramic body.

The first external electrode may extend to one or more of the first main surface, the second main surface, and the second lateral surface of the ceramic body.

The second external electrode may extend to one or more of the first main surface, the second main surface, and the second lateral surface of the ceramic body.

The insulating layers may include one or more selected from the group consisting of epoxy, a heat-resistant polymer, glass, and a ceramic.

The insulating layers may be lower than the first and second external electrodes measured from the first lateral surface of the ceramic body.

According to an aspect of the present invention, there is provided a multilayer ceramic electronic component including: a ceramic body including a dielectric layer and having first and second main surfaces opposing one another, first and second lateral surfaces opposing one another, and first and second end surfaces opposing one another; a plurality of first internal electrodes formed within the ceramic body, including a capacitance formation part having an overlap region to form capacitance and exposed to the first lateral surface, the first end surface, and the second end surface and a first lead out portion extending from the capacitance formation part so as to be exposed to the first lateral surface, and formed to be spaced apart from the second lateral surface by a predetermined interval; a plurality of second internal electrodes alternately laminated together with the first internal electrodes with the dielectric layer interposed therebetween, insulated from the first internal electrodes, having a second lead out portion extending from the capacitance formation part so as to be exposed to the first lateral surface, and formed to be spaced apart from the second lateral surface by a predetermined interval; first and second external electrodes connected to the first lead out portion and the second lead out portion, respectively; and insulating layers formed on the first lateral surface, the first end surface, and the second end surface of the ceramic body, respectively, wherein a length of the first lead out portion and that of the second lead out portion in the length direction of the ceramic body are different, and when the longest distance between the uppermost internal electrode and the lowermost electrode, among the plurality of first and second internal electrodes, is T1 and the shortest distance therebetween is T2, $0.76 \leq T2/T1 \leq 0.97$ is satisfied.

Three or more of the plurality of first and second internal electrodes may form a single block, and the blocks may be iteratively laminated.

The first and second internal electrode patterns may be disposed to have the same shape within the respective blocks.

An amount of blocks may be 5 or more.

When the longest distance between the uppermost internal electrode and the lowermost electrode, among the plurality of first and second internal electrodes 121 and 122, is T1 and the shortest distance therebetween is T2, $0.85 \leq T2/T1 \leq 0.90$ may be satisfied.

The first and second internal electrodes may be disposed to be perpendicular with respect to a mounting surface of the ceramic body.

The first external electrode may extend to one or more of the first main surface, the second main surface, and the second lateral surface of the ceramic body.

The second external electrode may extend to one or more of the first main surface, the second main surface, and the second lateral surface of the ceramic body.

The insulating layers may include one or more selected from the group consisting of epoxy, a heat-resistant polymer, glass, and a ceramic.

The insulating layers may be lower than the first and second external electrodes measured from the first lateral surface of the ceramic body.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
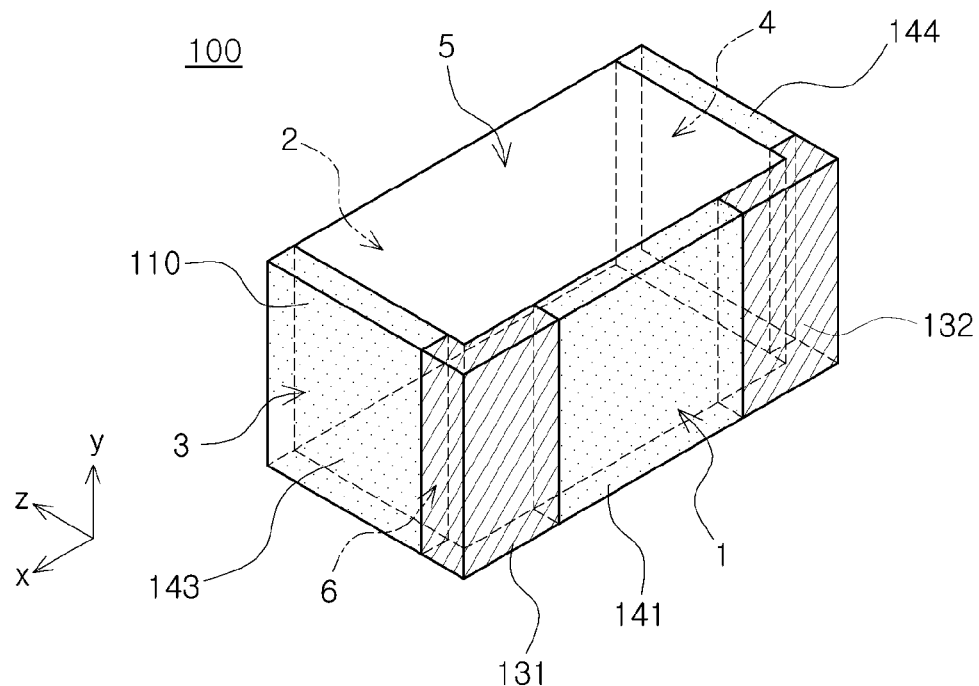
FIG. 1 is a perspective view illustrating a schematic structure of a multilayer ceramic capacitor (MLCC) according to an embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

Figure 2:
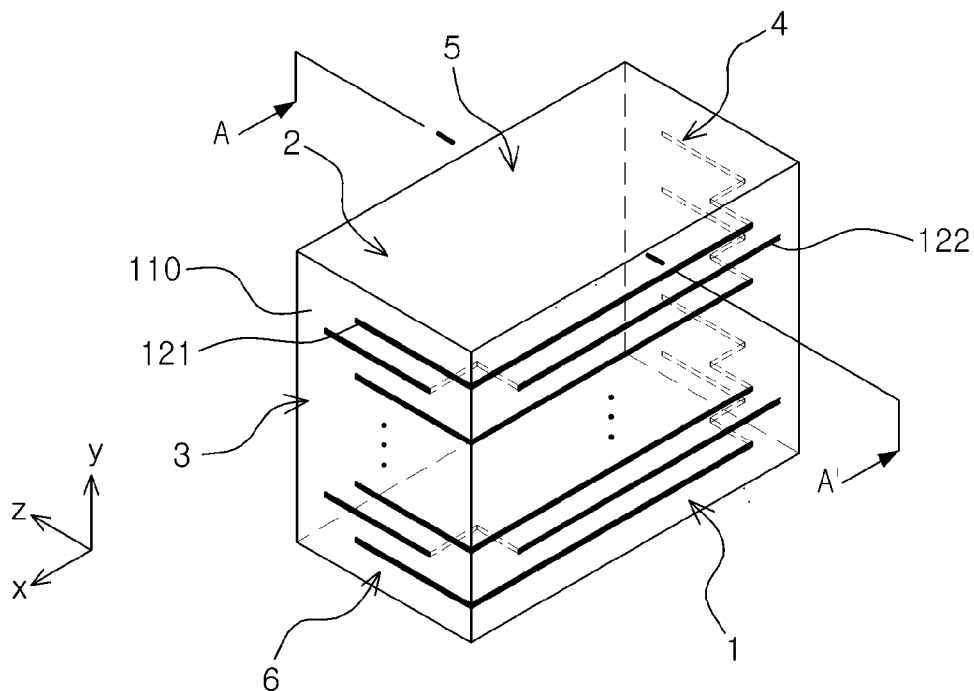
FIG. 2 is a schematic perspective view of a ceramic body of the MLCC illustrated in FIG. 1.
Figure 3:
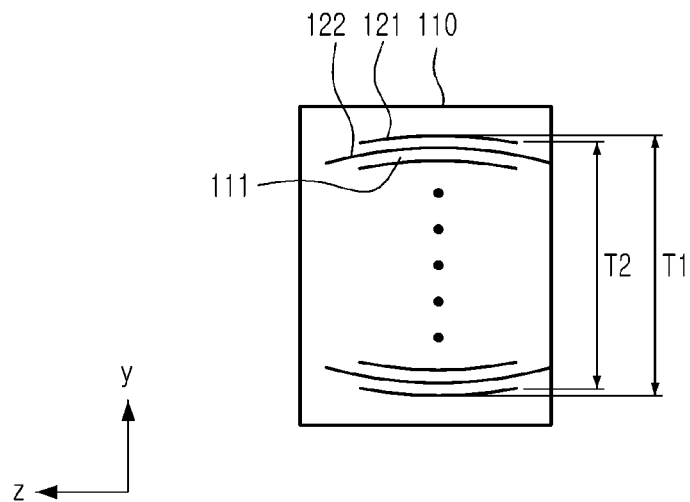
FIG. 3 is a cross-sectional view taken along line A-A' in FIG. 2.
Figure 4:
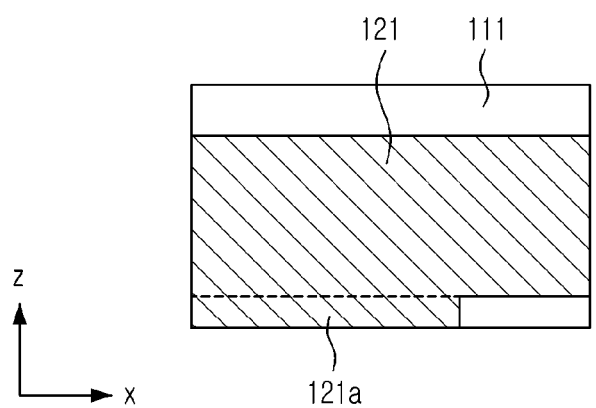
FIG. 4 is a cross-sectional view illustrating a structure of a first internal electrode of FIG. 1.
Figure 5:
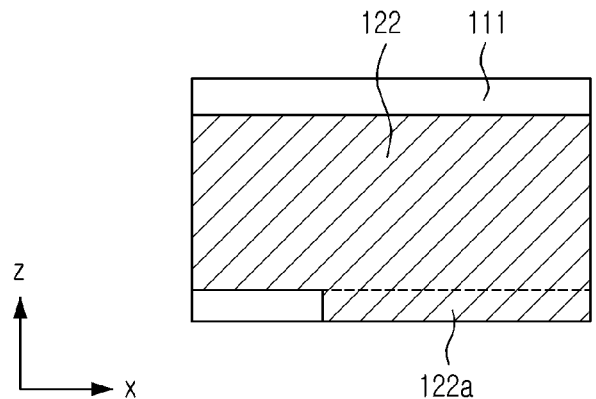
FIG. 5 is a cross-sectional view illustrating a structure of a second internal electrode of FIG. 1.
Figure 6:
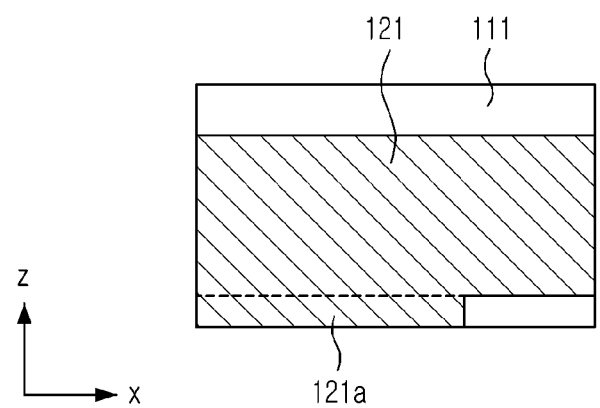
FIG. 6 is a cross-sectional view illustrating a structure of a different first internal electrode of FIG. 1.
Figure 7:
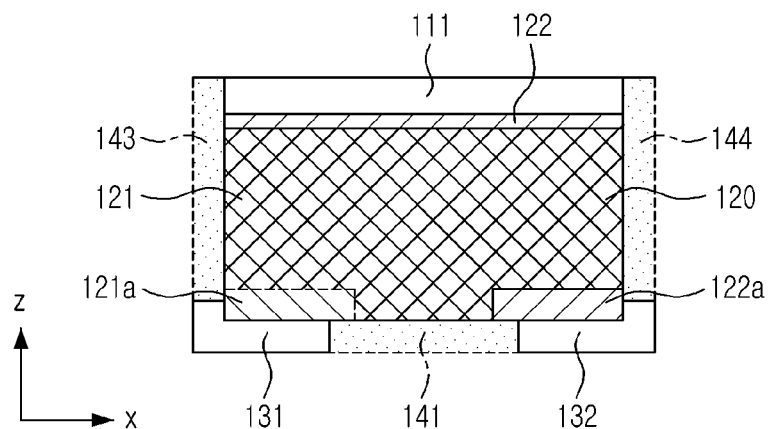
FIG. 7 is a schematic view illustrating a coupling structure of the first and second internal electrodes and first and second external electrodes in FIG. 1.

FIG. 1 is a perspective view illustrating a schematic structure of a multilayer ceramic capacitor (MLCC) according to an embodiment of the present invention;

FIG. 2 is a schematic perspective view of a ceramic body of the MLCC illustrated in FIG. 1;

FIG. 3 is a cross-sectional view taken along line A-A' in FIG. 2;

FIG. 4 is a cross-sectional view illustrating a structure of a first internal electrode of FIG. 1;

FIG. 5 is a cross-sectional view illustrating a structure of a second internal electrode of FIG. 1;

FIG. 6 is a cross-sectional view illustrating a structure of a different first internal electrode of FIG. 1;

FIG. 7 is a schematic view illustrating a coupling structure of the first and second internal electrodes and first and second external electrodes in FIG. 1.

A multilayer ceramic capacitor (MLCC) according to the present embodiment may be a 2-terminal vertically laminated capacitor. Here, 'vertically laminated' (or 'vertical multi-layer') refers to a configuration in which internal electrodes laminated in a capacitor are disposed vertically on a mounting region surface of a circuit board and '2-terminal' refers to two terminals connected to a circuit board, as terminals of a capacitor.

Referring to FIGS. 1 through 7, an MLCC 100 according to an embodiment of the present invention may include a ceramic body 110, internal electrodes 121 and 122 formed within the ceramic body 110, insulating layers 141, 143, and 144, and external electrodes 131 and 132.

In the present embodiment, the ceramic body 110 may have a first main surface 5, a second main surface 6, a first lateral surface 1 connecting the first main surface and the second main surface, a second lateral surface 2, a first end surface 3, and a second end surface 4. As illustrated, the ceramic body 110 may have a hexahedral shape, but the shape of the ceramic body 110 is not particularly limited. According to an embodiment of the present invention, the first lateral surface 1 of the ceramic body 110 may be a mounting surface disposed in a mounting region of a circuit board.

According to an embodiment of the present invention, an x direction may be a direction in which the first and second external electrodes are formed to be spaced apart from one another by a predetermined interval, a y direction may be a direction in which internal electrodes are laminated with dielectric layers interposed therebetween, and a z direction may be a direction in which the internal electrodes are mounted on a circuit board.

According to an embodiment of the present invention, the ceramic body 110 may be formed by laminating a plurality of dielectric layers. The plurality of dielectric layers 111 constituting the ceramic body 110 are in a sintered state in which adjacent dielectric layers are integrated such that boundaries therebetween may not be readily apparent.

The dielectric layers 111 may be formed by firing ceramic green sheets including ceramic powder, an organic solvent, and an organic binder. The ceramic powder is a material having a high K-dielectric constant (or high permittivity), and as the ceramic powder, for example, a barium titanate (BaTiO$_3$)-based material, a strontium titanate (SrTiO$_3$)-based material, or the like, may be used, but the present invention is not limited thereto.

According to an embodiment of the present invention, internal electrodes may be formed within the ceramic body 110.

Referring to FIGS. 3 through 5, a first internal electrode 121 having a first polarity and a second internal electrode 122 having a second polarity may be paired, and the pair of first internal electrodes 121 and the second internal electrodes 122 may be disposed in the y direction, such that they face one another with one dielectric layer 111 interposed therebetween.

According to an embodiment of the present invention, the first and second internal electrodes 121 and 122 may be disposed vertically with respect a mounting surface, i.e., on the first lateral surface 1, of the MLCC.

In an embodiment of the present invention, 'first' and 'second' may refer to different electrical charge polarities.

According to an embodiment of the present invention, the first and second internal electrodes 121 and 122 may be formed with a conductive paste including a conductive metal.

The conductive metal may be nickel (Ni), copper (Cu), palladium (Pd), or an alloy thereof.

The internal electrode layers may be formed by printing the conductive paste on ceramic green sheets constituting the dielectric layers through a printing method such as a screen printing method or a gravure printing method.

The ceramic green sheets with the internal electrode layers printed thereon may be alternately laminated and fired to form the ceramic body.

The MLCC 100 according to an embodiment of the present invention may include: a plurality of first internal electrodes 121 formed within the ceramic body 110, including a capacitance formation part 120 having an overlap region to form capacitance and exposed to the first lateral surface 1, the first end surface 3, and the second end surface 4 and a first lead out portion 121a extending from the capacitance formation part 120 so as to be exposed to the first lateral surface 1, and formed to be spaced apart from the second lateral surface 2 by a predetermined interval; and a plurality of second internal electrodes 122 alternately laminated together with the first internal electrodes 121 with the dielectric layer 111 interposed therebetween, insulated from the first internal electrodes 121, having a second lead out portion 122a extending from the capacitance formation part 120 so as to be exposed to the first lateral surface 1, and formed to be spaced apart from the second lateral surface 2 by a predetermined interval.

In order to be connected to external electrodes having different polarities, the first and second internal electrodes 121 and 122 have the first and second lead out portions 121a and 122a, respectively, and the first and second lead out portions 121a and 122a may be exposed to the first lateral surface 1 of the ceramic body 110.

According to an embodiment of the present invention, the MLCC is a vertically laminated MLCC, and the first and second lead out portions 121a and 122a may be exposed to the same surface of the ceramic body 110.

According to an embodiment of the present invention, the lead out portions 121a and 121b of the internal electrodes 121 and 122 may refer to regions, of conductive patterns, having increased widths W and being exposed to one surface of the ceramic body 110.

The first and second internal electrodes 121 and 122 form capacitance in overlap regions thereof, and the first and second lead out portions 121a and 122a connected to external electrodes having different polarities do not have an overlap region.

Since the first and second lead out portions 121a and 122a are insulated, without overlapping, a short circuit defect between the internal electrodes due to a thrust phenomenon of mutually facing internal electrodes due to cutting stress when the ceramic body 110 is cut may be improved.

Since the first lead out portion 121a and the second lead out portion 122a do not overlap, the first internal electrode 121 and the second internal electrode 122 may be insulated.

According to an embodiment of the present invention, a distance between the plurality of first internal electrodes 121 and the second lateral surface 2 and a distance between the plurality of second internal electrodes 122 and the second lateral surface 2 may be different.

Since the distance between the plurality of first internal electrodes 121 and the second lateral surface 2 and the distance between the plurality of second internal electrodes 122 and the second lateral surface 2 are different, an influence of steps between a region in which the plurality of first internal electrodes 121 and the plurality of second internal electrodes 122 are formed and a region in which first internal electrodes and second internal electrodes are not formed can be minimized, preventing a delamination defect.

Namely, since the alternately laminated first and second internal electrodes 121 and 122 are formed such that a distance between the first internal electrode 121 and the second lateral surface 2 and a distance between the second internal electrode 122 and the second lateral surface 2 are different, influence due to steps can be minimized in comparison to a case in which the distances between first and second internal electrodes 121 and 122 and the second lateral surface are equal.

According to an embodiment of the present invention, when the longest distance between the uppermost internal electrode and the lowermost electrode, among the plurality of first and second internal electrodes 121 and 122, is T1 and the shortest distance therebetween is T2, $0.76 \leq T2/T1 \leq 0.97$ may be satisfied.

Referring to FIG. 3, the longest distance T1 between the uppermost internal electrode and the lowermost electrode among the plurality of first and second internal electrodes 121 and 122 may be defined as the longest distance in the thickness direction between the outermost internal electrodes among the plurality of first and second internal electrodes 121 and 122 laminated within the ceramic body 110.

The plurality of first and second internal electrodes 121 and 122 are warped in the thickness direction of the ceramic body 110 and, in this case, the longest distance and the shortest distance exist between the outermost internal electrodes among the plurality of first and second internal electrodes 121 and 122 in the thickness direction of the ceramic body 110.

According to an embodiment of the present invention, T1 may be defined as the longest distance between the outermost internal electrodes, among the plurality of first and second internal electrodes 121 and 122 laminated within the ceramic body 110 in the thickness direction.

Meanwhile, since the plurality of first and second internal electrodes 121 and 122 are warped in the thickness direction of the ceramic body 110, the uppermost and lowermost internal electrodes may respectively have the highest point and the lowest point in the thickness direction of the ceramic body 110.

According to an embodiment of the present invention, in the uppermost and lowermost internal electrodes, an interval between the lowest points in the thickness direction of the ceramic body 110 may be defined as T2.

A method of adjusting T2 and T1 to satisfy $0.76 \le T2/T1 \le 0.97$ will be described in detail in a method of manufacturing a multilayer ceramic capacitor (MLCC) according to another embodiment of the present invention as described hereinafter. The MLCC according to an embodiment of the present invention may be implemented by forming a plurality of block laminates and laminating the block laminates during a manufacturing process.

The block laminates may be formed by determining three or more of first and second internal electrodes 121 and 122 as a single block and laminating three or more of a plurality of ceramic green sheets with first and second internal electrode patterns having different widths formed thereon.

Thus, the MLCC according to an embodiment of the present invention may satisfy $0.76 \le T2/T1 \le 0.97$ and delamination may be prevented, enhancing reliability.

If the value of T2/T1 is less than 0.76, a difference between the longest distance T1 and the shortest distance T2 between the uppermost internal electrode and the lowermost electrode among the plurality of first and second internal electrodes 121 and 122 is increased to cause delamination, or the like, degrading reliability.

If the value of T2/T1 exceeds 0.97, there is little difference between the longest distance T1 and the shortest distance T2 between the uppermost internal electrode and the lowermost electrode among the plurality of first and second internal electrodes 121 and 122 to cause delamination, or the like, degrading reliability.

In particular, according to an embodiment of the present invention, In a case in which the longest distance between the uppermost internal electrode and the lowermost electrode, among the plurality of first and second internal electrodes 121 and 122, is T1 and the shortest distance therebetween is T2, when $0.85 \le T2/T1 \le 0.90$ is satisfied, reliability can be further enhanced.

Three or more of the plurality of first and second internal electrodes 121 and 122 form a single block, but the present invention is not limited thereto and various numbers of the first and second internal electrodes 121 and 122 may be set as a single block in order to achieve the objects of the present invention.

The amount of blocks may be 5 or more, but the present invention is not limited thereto and the amount of blocks may be determined in consideration of capacitance of an MLCC.

Also, the ceramic body 110 may be formed by iteratively laminating the blocks.

FIG. 3 illustrates that a total of three first and second internal electrodes 121 and 122 is provided as a single block.

Referring to FIG. 3, when a single block includes a total of three first and second internal electrodes 121 and 122, the first internal electrode, the second internal electrode, and the first internal electrode are sequentially laminated, and in this case, a width of the second internal electrode may be greater than that of the first internal electrode.

In this manner, a total of three or more of the first and second internal electrodes 121 and 122 may be set as a single block and a plurality of same blocks may be laminated to form the ceramic body 110 to solve a problem of steps between the dielectric layer 111 and the plurality of first and second internal electrodes 121 and 122, thereby implementing an MLCC having excellent reliability.

A lamination amount of the plurality of first and second internal electrodes is not particularly limited and, for example, may be 150 layers or more.

In particular, since three or more of the plurality of first and second internal electrodes 121 and 122 form a single block and the blocks are iteratively laminated, whereby when the longest distance between the uppermost internal electrode and the lowermost electrode, among the plurality of first and second internal electrodes 121 and 122, is T1 and the shortest distance therebetween is T2, $0.76 \le T2/T1 \le 0.97$ may be satisfied.

In general, as the lamination amount is increased in the MLCC, a step between the region in which the plurality of first internal electrode 121 and the second internal electrode 122 is formed and the region in which no internal electrode is formed is increased in the width direction of the ceramic body 110.

The step may cause delamination when the ceramic body 110 is cut, seriously degrading reliability.

According to an embodiment of the present invention, when the longest distance between the uppermost internal electrode and the lowermost electrode, among the plurality of first and second internal electrodes 121 and 122, is T1 and the shortest distance therebetween is T2, T1 and T2 are adjusted to satisfy $0.76 \le T2/T1 \le 0.97$, whereby a step between the region in which the plurality of first internal electrode 121 and the second internal electrode 122 is formed and the region in which no internal electrode is formed can be reduced.

Thus, delamination occurring when the ceramic body is cut can be improved, implementing an MLCC having excellent reliability.

Referring to FIG. 7, the first external electrode 131 may be connected to the first lead out portion 121a of the first internal electrode 121 led to the first lateral surface 1 of the ceramic body 110, and the second external electrode 132 may be connected to the second lead out portion 122a of the second internal electrode 122 led to the first lateral surface 1 of the ceramic body 110.

The first external electrode 131 may be formed on the first lateral surface 1 of the ceramic body 110 so as to be connected to the first lead out portion 121a and may extend to the first end surface 3 of the ceramic body 110, but the present invention is not limited thereto.

Also, the second external electrode 132 may be formed on the first lateral surface 1 of the ceramic body 110 so as to be connected to the second lead out portion 122a and may extend to the second end surface 4 of the ceramic body 110, but the present invention is not limited thereto.

Namely, the first external electrode 131 may extend to one or more of the first main surface 5, the second main surface 6, and the second lateral surface 2 of the ceramic body 110.

Also, the second external electrode 132 may extend to one or more of the first main surface 5, the second main surface 6, and the second lateral surface 2 of the ceramic body 110.

Thus, according to an embodiment of the present invention, the first external electrode 131 may be connected to the first lead out portion 121a of the first internal electrode 121 led out to the first lateral surface 1 of the ceramic body 110 and surround one end portion of the ceramic body 110 in the length direction of the ceramic body 110.

Also, the second external electrode 132 may be connected to the second lead out portion 122a of the second internal electrode 122 led out to the first lateral surface 1 of the ceramic body 110 and surround the other end portion of the ceramic body 110 in the length direction of the ceramic body 110.

The first and second external electrodes 131 and 132 may be formed with a conductive paste including a conductive metal.

The conductive metal may be a nickel (Ni), copper (Cu), tin (Sn), or an alloy thereof, but the present invention is not limited thereto.

The conductive paste may further include an insulating material and, in this case, the insulating material may be, for example, glass, but the present invention is not limited thereto.

A method for forming the first and second external electrodes 131 and 132 is not particularly limited. The first and second external electrodes 131 and 132 may be formed by dipping the ceramic body 110, or any other method, such as plating, or the like, may also be used.

Meanwhile, according to an embodiment of the present invention, as illustrated in FIG. 7, the insulating layers 141, 143, and 144 may be formed on the first lateral surface 1, the first end surface 3, and the second end surface 4 of the ceramic body 110.

The insulating layer 141 formed on the first lateral surface 1 may be formed between the first and second external electrodes 131 and 132.

The insulating layer 141 formed on the first lateral surface 1 may cover the first lead out portion 121a exposed to the first lateral surface 1, and may also cover the entirety of the overlap regions of the first and second internal electrodes 121 and 122.

According to an embodiment of the present invention, as illustrated in FIG. 7, the insulating layer 141 formed on the first lateral surface 1 may completely fill a portion between the first and second external electrodes 131 and 132 on one surface of the ceramic body 110.

Also, although not shown, according to an embodiment of the present invention, the first insulating layer 141 formed on the first lateral surface 1 may only cover the first lead out portion 121a and may be formed to be spaced apart from the first and the second external electrodes 131 and 132 by a predetermined interval.

Meanwhile, the insulating layers 143 and 144 may cover the entirety of exposed portions of the first internal electrode 121.

According to an embodiment of the present invention, a height of the first insulating layer 141 formed on the first lateral surface 1 may be lower than the first external electrode 131 or the second external electrode 132. The height of the insulating layer 141 and the external electrodes 131 and 132 may be measured based on the mounting surface, i.e., the first lateral surface 1.

According to an embodiment of the present invention, since the height of the insulating layer 141 formed on the first lateral surface 1 is lower than the height of the first and second external electrodes 131 and 132, the MLCC 100 may be more stably mounted on a circuit board.

Also, the first and second external electrodes 131 and 132 may be formed on portions of the first lateral surface 1 of the ceramic body 110.

The insulating layers 141, 143, and 144 may include, for example, one or more selected from the group consisting of epoxy, a heat-resistant polymer, glass, and a ceramic, but the present invention is not limited thereto.

According to an embodiment of the present invention, the insulating layers 141, 143, and 144 may be formed with ceramic slurry.

A formation position and height of the insulating layers 141, 143, and 144 may be adjusted by adjusting an amount and a configuration of the ceramic slurry.

After the ceramic body 110 is formed through a firing process, the insulating layers 141, 143, and 144 may be formed by coating ceramic slurry on the ceramic body 110 and subsequently firing the same.

Alternatively, the ceramic slurry for forming an insulating layer may be formed on ceramic green sheets forming the ceramic body 110 and fired together therewith to thus form the insulating layers 141, 143, and 144.

A method for forming the ceramic slurry is not particularly limited. For example, the ceramic slurry may be jetted according to a spraying method or may be coated by using a roller.

The insulating layer 141 formed on the first lateral surface 1 may cover the first lead out portion 121a exposed to one surface of the ceramic body 110 to prevent a short circuit between the internal electrodes and an internal defect such as a degradation of moisture resistance characteristics, or the like.

Figure 8:
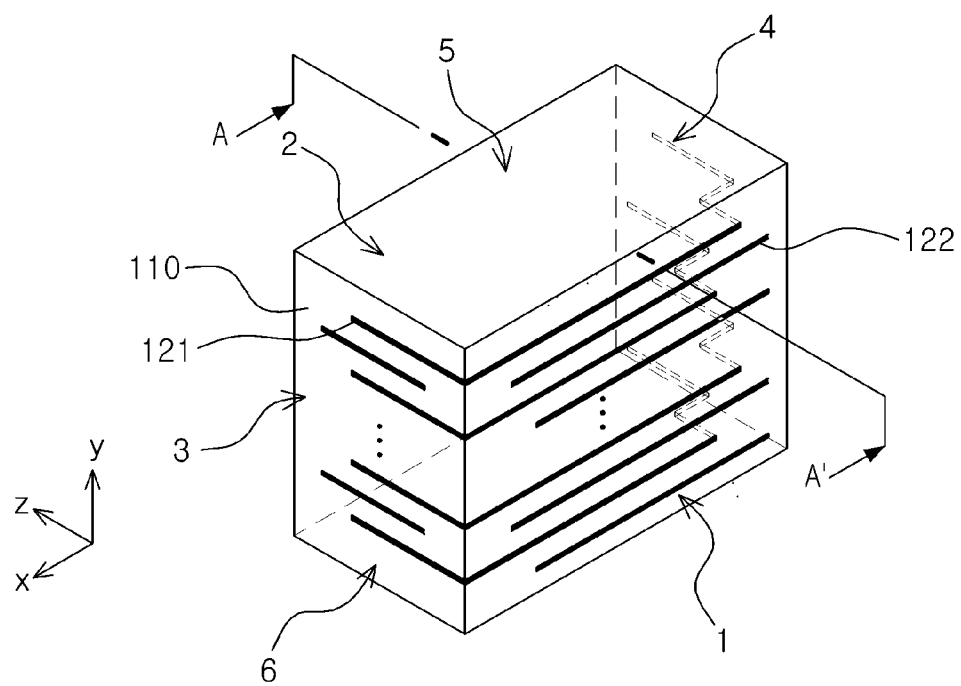
FIG. 8 is a perspective view illustrating a schematic structure of a multilayer ceramic capacitor (MLCC) according to another embodiment of the present invention.
Figure 9:
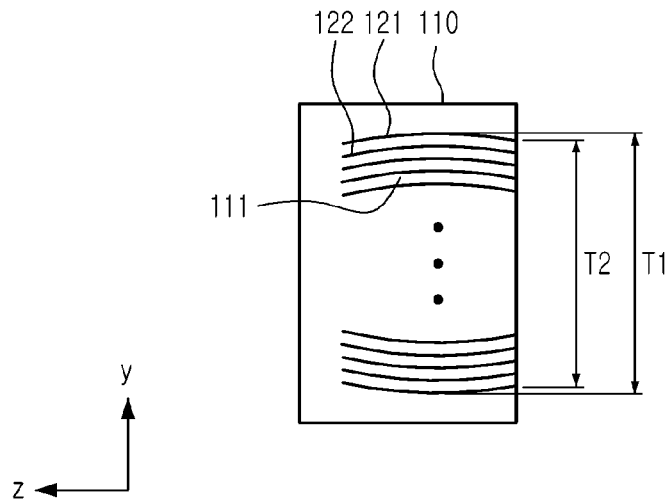
FIG. 9 is a cross-sectional view taken along line A-A' in FIG. 8.
Figure 10:
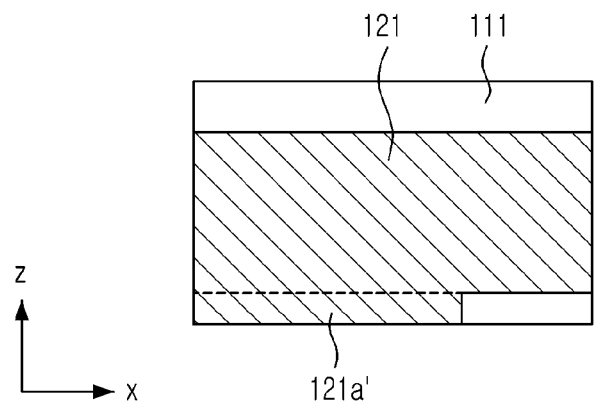
FIG. 10 is a cross-sectional view illustrating a structure of a first internal electrode of FIG. 8.
Figure 11:
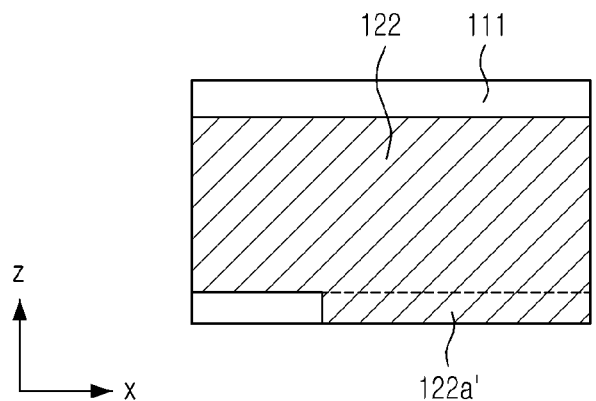
FIG. 11 is a cross-sectional view illustrating a structure of a second internal electrode of FIG. 8.
Figure 12:
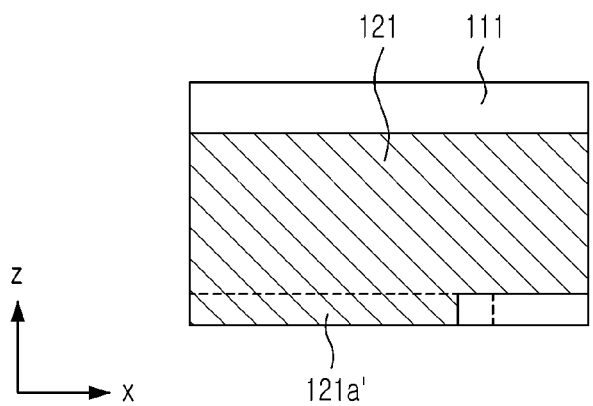
FIG. 12 is a cross-sectional view illustrating a structure of a different first internal electrode of FIG. 8.
Figure 13:
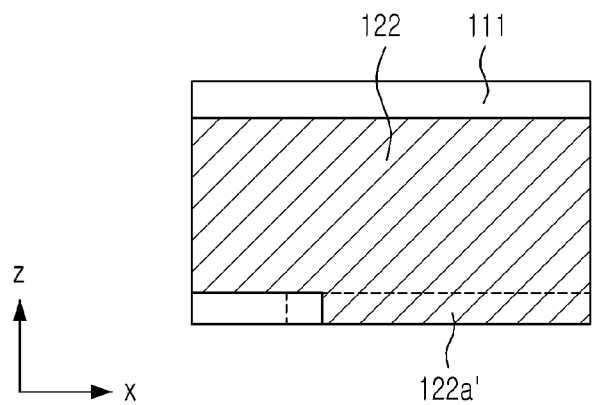
FIG. 13 is a cross-sectional view illustrating a structure of a different second internal electrode of FIG. 8.
Figure 14:
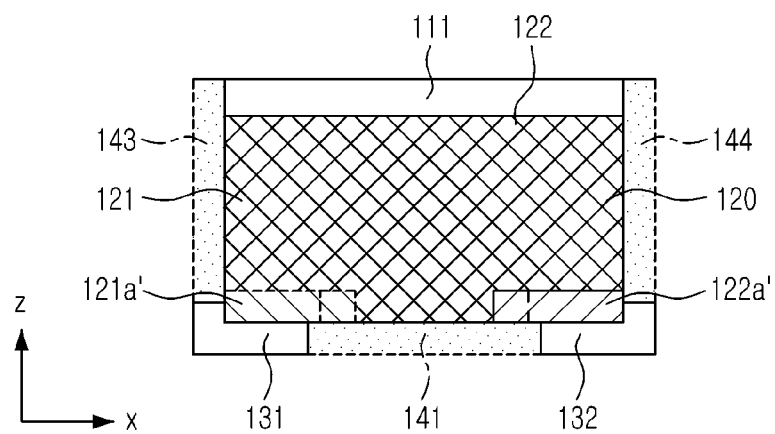
FIG. 14 is a schematic view illustrating a coupling structure of the first and second internal electrodes and first and second external electrodes in FIG. 8.

FIG. 8 is a perspective view illustrating a schematic structure of a multilayer ceramic capacitor (MLCC) according to another embodiment of the present invention;

FIG. 9 is a cross-sectional view taken along line A-A' in FIG. 8;

FIG. 10 is a cross-sectional view illustrating a structure of a first internal electrode of FIG. 8;

FIG. 11 is a cross-sectional view illustrating a structure of a second internal electrode of FIG. 8;

FIG. 12 is a cross-sectional view illustrating a structure of a different first internal electrode of FIG. 8;

FIG. 13 is a cross-sectional view illustrating a structure of a different second internal electrode of FIG. 8; and FIG. 14 is a schematic view illustrating a coupling structure of the first and second internal electrodes and first and second external electrodes in FIG. 8.

Referring to FIGS. 8 through 14, an MLCC according to another embodiment of the present invention may include: a ceramic body 110 including a dielectric layer 111 and having first and second main surfaces 5 and 6 opposing one another, first and second lateral surfaces 1 and 2 opposing one another, and first and second end surfaces 3 and 4 opposing one another; a plurality of first internal electrodes 121 formed within the ceramic body 110, including a capacitance formation part 120 having an overlap region to form capacitance and exposed to the first lateral surface 1, the first end surface 3, and the second end surface 4 and a first lead out portion 121a' extending from the capacitance formation part 120 so as to be exposed to the first lateral surface 1, and formed to be spaced apart from the second lateral surface 2 by a predetermined interval; a plurality of second internal electrodes 122 alternately laminated together with the first internal electrodes 121 with the dielectric layer 111 interposed therebetween, insulated from the first internal electrodes 121, having a second lead out portion 122a' extending from the capacitance formation part 120 so as to be exposed to the first lateral surface 1, and formed to be spaced apart from the second lateral surface 2 by a predetermined interval; first and second external electrodes 131 and 132 connected to the first lead out portion 121a' and the second lead out portion 122a', respectively; and insulating layers 141, 143, and 144 formed on the first lateral surface 1, the first end surface 3, and the second end surface 4 of the ceramic body 110, respectively, wherein a length of the first lead out portion 121a' and that of the second lead out portion 122a' in the length direction of the ceramic body 110 are different, and when the longest distance between the uppermost internal electrode and the lowermost electrode, among the plurality of first and second internal electrodes 121 and 122, is T1 and the shortest distance therebetween is T2, $0.76 \le T2/T1 \le 0.97$ is satisfied.

Three or more of the plurality of first and second internal electrodes may form a block, and the blocks may be iteratively laminated.

The first and second internal electrode patterns may be disposed to have the same shape within the respective blocks.

An amount of the blocks may be 5 or more.

When the longest distance between the uppermost internal electrode and the lowermost electrode, among the plurality of first and second internal electrodes 121 and 122, is T1 and the shortest distance therebetween is T2, $0.85 \le T2/T1 \le 0.90$ may be satisfied.

The first and second internal electrodes 121 and 122 may be disposed to be perpendicular with respect to a mounting surface of the ceramic body 110.

The first external electrode 131 may extend to one or more of the first main surface 5, the second main surface 6, and the second lateral surface 2 of the ceramic body 110.

The second external electrode 132 may extend to one or more of the first main surface 5, the second main surface 6, and the second lateral surface 2 of the ceramic body 110.

The insulating layers 141, 143, and 144 may include one or more selected from the group consisting of epoxy, a heat-resistant polymer, glass, and a ceramic.

The insulating layers 141, 143, and 144 may be lower than the first and second external electrodes 131 and 132 measured from the first lateral surface 1 of the ceramic body 110.

Elements different from those of the foregoing embodiment of the present invention will be mainly described, and a detailed description of the same elements will be omitted.

In the MLCC 100 according to another embodiment of the present invention, a length of the first lead out portion 121a' and that of the second lead out portion 122a' in the length direction of the ceramic body 110 may be different.

Referring to FIG. 8, when a single block includes a total of four first and second internal electrodes 121 and 122, the first internal electrode, the second internal electrode, the first internal electrode and the second internal electrode are sequentially laminated, and in this case, lengths of the respective first lead out portions 121a' and those of the respective second lead out portions 122a' in the length direction of the ceramic body 110 are different.

In this manner, since the lengths of the first lead out portions 121a' and those of the second lead out portions 122a' of the plurality of first internal electrodes 121 and the plurality of second internal electrodes 122 in the length direction of the ceramic body 110 are different, an influence of a step between the region in which the plurality of first lead out portions 121a' and the plurality of second lead out portions 122a' are formed and the region in which no lead out portion is formed is minimized, preventing delamination.

Namely, since the lengths of the first lead out portions 121a' and those of the second lead out portions 122a' of the alternately laminated first internal electrodes 121 and second internal electrodes 122 in the length direction of the ceramic body 110 are different, an influence of a step can be minimized in comparison to a case that the lengths of the first lead out portions 121a' and those of the second lead out portions 122a' are equal.

Also, since the lengths of the first lead out portions 121a' and those of the second lead out portions 122a' are different, when the longest distance between the uppermost internal electrode and the lowermost electrode, among the plurality of first and second internal electrodes 121 and 122, is T1 and the shortest distance therebetween is T2, $0.76 \le T2/T1 \le 0.97$ may be satisfied.

Hereinafter, a method for manufacturing a multilayer ceramic electronic component will be described. In this case, an MLCC will be described as an example, but the present invention is not limited thereto.

According to a method for manufacturing an MLCC, first, a plurality of ceramic green sheets may be prepared with slurry including ceramic powder.

The ceramic powder is not particularly limited and may be, for example, barium titanate ($BaTiO_3$).

Next, first and second internal electrode patterns may have different widths on the plurality of ceramic green sheets, with conductive paste including metal powder.

The metal powder may include one or more selected from the group consisting of palladium (Pd), a palladium-silver (Pd—Ag) alloy, nickel (Ni), and copper (Cu).

A plurality of block laminates may be formed by laminating three or more of the plurality of ceramic green sheets.

Widths of the first and second internal electrode patterns formed on the plurality of ceramic green sheets constituting the plurality of block laminates may be different.

Also, the first and second internal electrode patterns may be disposed to have the same shape within the plurality of block laminates, respectively.

Namely, when the plurality of block laminates are formed by laminating three ceramic green sheets, the first internal electrode, the second internal electrode, and the first internal electrode are sequentially laminated, and in this case, the width of the second internal electrode may be greater than those of the upper and lower first internal electrodes.

Meanwhile, after the plurality of block laminates are formed, compressing the plurality of block laminates may be performed, but the present invention is not limited thereto.

The plurality of block laminates are compressed, respectively, and subsequently laminated. Thus, when the longest distance between the uppermost internal electrode and the lowermost electrode, among the plurality of first and second internal electrodes 121 and 122, within the ceramic body is T1 and the shortest distance therebetween is T2, $0.76 \le T2/T1 \le 0.97$ may be satisfied.

Namely, compared to a case in which a plurality of first and second internal electrodes of the ceramic body are entirely laminated, compressed, and fired, when the ceramic green sheets with first and second internal electrode patterns having different widths formed thereon are divided into three or more parts to form block laminates and compressed, a problem of steps can be solved.

Thereafter, the plurality of block laminates are laminated and fired to form a ceramic body including a plurality of first and second internal electrodes.

The ceramic body may be formed through the foregoing process, and in this case, a lamination amount of the plurality of first and second internal electrodes may be 150 layers or more, but the present invention is not limited thereto.

Hereinafter, an embodiment of the present invention will be described in more detail, but the present invention is not limited thereto.

The MLCC according to the present embodiment was manufactured as follows.

First, slurry including a powder such as barium titanate ($BaTiO_3$), or the like, having an average particle diameter of 0.1 μm was applied to a carrier film and dried to prepare a plurality of ceramic green sheets having a thickness ranging from 1.05 μm to 0.95 μm to thus form dielectric layers.

Next, conductive paste for internal electrode including nickel powder having an average particle size ranging from 0.1 μm to 0.2 μm was prepared.

The conductive paste for internal electrode was prepared to further include barium titanate ($BaTiO_3$) in addition to the nickel powder.

The conductive paste for internal electrode was coated on the green sheets through a screen printing method to form internal electrodes having different widths, and three or more ceramic green sheets were subsequently laminated to form a plurality of block laminates.

Thereafter, the plurality of block laminates were laminated and, here, a lamination amount of first and second internal electrodes was 300, and a total layer amount of the first and second internal electrodes of each of the block laminates was 10.

Thereafter, the ceramic body was compressed and cut to form a 0603-sized chip, and the chip was fired under a reducing atmosphere of $H_2$ 0.1% or less at a temperature ranging from 1,050 to 1,200° C.

Thereafter, a process of forming external electrodes, a plating process, and the like, were performed to fabricate a multilayer ceramic capacitor (MLCC).

A comparative example was manufactured according to a general MLCC manufacturing process.

Results of performing a delamination test on the embodiment and the comparative examples show that, in the case of the embodiment of the present invention, 100 samples had no delamination defect, while in the case of the comparative example, 38 samples, among 100 samples, had a delamination defect.

According to an embodiment of the present invention, the overlap regions are even formed in the portions of the first and second internal electrodes exposed to the lateral surface, increasing capacitance of the MLCC.

Also, since the distance between the first and second internal electrodes to which voltages having different polarities are applied is shortened, a current loop can be reduced, and thus, equivalent series inductance (ESL) can be lowered.

As set forth above, according to embodiments of the invention, the first internal electrodes and the second internal electrodes are formed such that widths thereof and or the lengths of the lead out portions thereof are different, to minimize a step between the dielectric layers and the internal electrodes, thus improving a short-circuit and delamination between the internal electrodes.

According to an embodiment of the present invention, since overlap regions of the first and second internal electrodes forming the capacitance formation part are increased, capacity of the multilayer ceramic capacitor can be increased.

Also, since the distance between the first and second internal electrodes to which voltages having different polarities are applied is reduced, a current loop can be shortened, and thus, equivalent series inductance (ESL) can be lowered.

In addition, according to an embodiment of the present invention, a mounting area of the multilayer ceramic capacitor on a printed circuit board can be minimized and acoustic noise can be significantly reduced.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component comprising:
a ceramic body including a dielectric layer and having first and second main surfaces opposing one another, first and second lateral surfaces opposing one another, and first and second end surfaces opposing one another;
a plurality of first internal electrodes formed within the ceramic body, including a capacitance formation part having an overlap region to form capacitance and exposed to the first lateral surface, the first end surface, and the second end surface and a first lead out portion extending from the capacitance formation part so as to be exposed to the first lateral surface, and formed to be spaced apart from the second lateral surface by a predetermined interval;
a plurality of second internal electrodes alternately laminated together with the first internal electrodes with the dielectric layer interposed therebetween, insulated from the first internal electrodes, having a second lead out portion extending from the capacitance formation part so as to be exposed to the first lateral surface, and formed to be spaced apart from the second lateral surface by a predetermined interval;
first and second external electrodes connected to the first lead out portion and the second lead out portion, respectively; and
insulating layers formed on the first lateral surface, the first end surface, and the second end surface of the ceramic body, respectively,
wherein a distance between the plurality of first internal electrodes and the second lateral surface and a distance between the plurality of second internal electrodes and the second lateral surface are different, three or more of the plurality of first and second internal electrodes form a single block, the blocks are iteratively laminated, a width of a central electrode may be is greater than that of an uppermost internal electrode and a lowermost internal electrode in the single block, and when the longest distance between the uppermost internal electrode and the lowermost internal electrode, among the plurality of first and second internal electrodes, is T1 and the shortest distance therebetween is T2, $0.76 \leq T2/T1 \leq 0.97$ is satisfied.

2. The multilayer ceramic electronic component of claim 1, wherein the first and second internal electrode patterns are disposed to have the same shape within the respective blocks.

3. The multilayer ceramic electronic component of claim 1, wherein an amount of blocks is 5 or more.

4. The multilayer ceramic electronic component of claim 1, wherein when the longest distance between the uppermost internal electrode and the lowermost internal electrode, among the plurality of first and second internal electrodes, is T1 and the shortest distance therebetween is T2, $0.85 \leq T2/T1 \leq 0.90$ is satisfied.

5. The multilayer ceramic electronic component of claim 1, wherein the first and second internal electrodes are disposed to be perpendicular with respect to a mounting surface of the ceramic body.

6. The multilayer ceramic electronic component of claim 1, wherein the first external electrode extends to one or more of the first main surface, the second main surface, and the second lateral surface of the ceramic body.

7. The multilayer ceramic electronic component of claim 1, wherein the second external electrode extends to one or more of the first main surface, the second main surface, and the second lateral surface of the ceramic body.

8. The multilayer ceramic electronic component of claim 1, wherein the insulating layers include one or more selected from the group consisting of epoxy, a heat-resistant polymer, glass, and a ceramic.

9. The multilayer ceramic electronic component of claim 1, wherein the insulating layers formed on the first end surface and the second end surface of the ceramic body are lower than the first and second external electrodes measured from the first lateral surface of the ceramic body.

* * * * *